United States Patent [19]
Hutchinson

[11] 3,859,381
[45] *Jan. 7, 1975

[54] CROSSLINKED POLYURETHANES FROM POLYURETHANE PRECURSORS AND VINYL MONOMERS

[75] Inventor: Francis Gowland Hutchinson, Runcorn, England

[73] Assignee: Imperial Chemical Industries Limited, London, England

[ * ] Notice: The portion of the term of this patent subsequent to Oct. 24, 1989, has been disclaimed.

[22] Filed: Apr. 19, 1973

[21] Appl. No.: 352,689

[52] U.S. Cl. ...... 260/859 R, 260/37 AL, 260/37 N, 260/75 TN, 260/75 NE, 260/77.5 CR
[51] Int. Cl. ........................................... C08g 41/04
[58] Field of Search .................................. 260/859

[56] References Cited
UNITED STATES PATENTS

| | | | |
|---|---|---|---|
| 2,806,836 | 9/1957 | Nischk | 260/859 |
| 2,879,248 | 3/1959 | Nischk | 260/859 |
| 3,008,917 | 11/1961 | Park | 260/859 |
| 3,047,530 | 7/1962 | Nischk | 260/859 |
| 3,509,234 | 4/1970 | Burlant | 260/859 |
| 3,700,752 | 10/1972 | Hutchinson | 260/859 |

FOREIGN PATENTS OR APPLICATIONS

| | | | |
|---|---|---|---|
| 956,720 | 1/1957 | Germany | 260/859 |
| 1,158,602 | 6/1958 | France | 260/859 |
| 971,199 | 12/1958 | Germany | 260/859 |
| 1,073,135 | 1/1960 | Germany | 260/859 |
| 1,126,602 | 3/1962 | Germany | 260/859 |
| 39-25195 | 11/1962 | Japan | 260/859 |

Primary Examiner—Paul Lieberman
Attorney, Agent, or Firm—Cushman, Darby & Cushman

[57] ABSTRACT

A process for the production of an elastomeric material from a homogeneous composition comprising from 50% to 95% by weight of the precursors of a cross-linked polyurethane capable of forming an amorphous elastomeric cross-linked polyurethane having a glass-rubber transition temperature (Tg) of 25° C or less, and preferably 0° C or less, and from 50% to 5% by weight of at least one polymerisable ethylenically unsaturated material, in the process the precursors of the polyurethane being reacted substantially to completion before polymerisation of the ethylenically unsaturated material is allowed to proceed to the extent that the polymer so produced forms a separate phase, polymerisation of the ethylenically unsaturated material thereafter being completed.

10 Claims, No Drawings

CROSSLINKED POLYURETHANES FROM POLYURETHANE PRECURSORS AND VINYL MONOMERS

This invention relates to a process for the production of an elastomeric material comprising a cross-linked polyurethane and a polymer of an ethylenically unsaturated material, and to an elastomeric material made by said process, and is a modification of the invention described in our British Pat. No. 1,239,701.

In the aforementioned specification, the disclosure of which is incorporated herein, we have described and claimed a process for the production of a polymeric material from a homogeneous composition comprising from 5% to 95% by weight of the precursors of a cross-linked polyurethane and from 95% to 5% by weight of at least one vinyl monomer, in the process the gelation of the polyurethane being substantially completed before polymerisation of the vinyl monomer is allowed to proceed to the extent that the vinyl polymer so produced forms a separate phase, and thereafter completing polymerisation of the vinyl monomer. We found that this process resulted in materials having improved properties when compared with the properties of materials prepared by simultaneously gelling the polyurethane and polymerising the vinyl monomer.

The precursors used in the production of the aforementioned polymeric material may be such as to be capable of forming an elastomeric polyurethane and we found, particularly where such polyurethane precursors were used and especially where they were used at relatively low concentrations, that the materials produced by the process had improved impact strengths when compared with the impact strengths of articles made from the vinyl polymer alone.

We have now found that where, in the process of the aforementioned specification, the precursors of the cross-linked polyurethane are chosen such that if reacted alone in the absence of a vinyl monomer they would produce an amorphous elastomeric polyurethane, and where the proportions of crosslinked polyurethane precursors and vinyl monomer used in the process are within defined limits, the process of the aforementioned specification results in the production of elastomeric materials having substantially improved properties, e.g. substantially improved tensile moduli and tensile strengths, when compared with the corresponding properties of the amorphous polyurethane elastomers alone prepared in the absence of the vinyl monomer.

According to the present invention there is provided a process for the production of an elastomeric material from a homogeneous composition comprising from 50% to 95% by weight of the precursors of a cross-linked polyurethane and from 50% to 5% by weight of at least one polymerisable ethylenically unsaturated material, in said process the precursors of the polyurethane being reacted substantially to completion before polymerisation of the ethylenically unsaturated material is allowed to proceed to the extent that the polymer so produced forms a separate phase, polymerisation of the ethylenically unsaturated material thereafter being completed, in which the precursors, when reacted alone in the absence of ethylenically unsaturated material, are capable of forming an amorphous elastomeric cross-linked polyurethane having a glass-rubber transition temperature (Tg) of 25° C or less.

The cross-linked polyurethane precursors should be capable of reacting in the absence of ethylenically unsaturated material to yield a cross-linked elastomeric polyurethane having a Tg of 25° C or less, and preferably 0° C or less, and also in the elastomeric material formed in the process of our invention the cross-linked polyurethane component in the material should have a Tg of 25° C or less, and preferably 0° C or less.

The glass-rubber transition temperature is readily measured, for example, using a Du Pont 900 Thermal Analyser at a rate of heating of 20° C per minute or by using a Torsion Pendulum at 1 cycle per second.

The polyurethane precursors, which are preferably free of groups reactive with the ethylenically unsaturated material, may comprise at least one polyfunctional compound containing isocyanate-reactive groups and at least one polyisocyanate. As the precursors should be capable of forming a cross-linked polyurethane the functionality of at least one of the polyfunctional compounds and/or at least one of the polyisocyanates should be greater than two. Furthermore, the precursors should be selected so as to be capable of producing an amorphous elastomeric cross-linked polyurethane by which we mean a cross-linked polyurethane which exhibits little or no crystallinity in a strained and in an unstrained state.

The man skilled in the art of polyurethane chemistry and technology will readily be able to select, for example, with the aid of simple tests, precursors which are capable of producing an amorphous cross-linked elastomeric polyurethane.

However, some general guidlines in the selection of suitable precursors, and in particular suitable polyfunctional compounds, which are capable of forming an amorphous cross-linked elastomeric polyurethane may be given. For example, amorphous polyurethanes tend to be produced from polyfunctional compounds which are polymeric materials in which there is non-uniformity along the polymer chain, for example, polymer chains produced by copolymerisation of a plurality of different materials. Amorphous polyurethanes tend to be produced from polyfunctional compounds which are polymeric materials in which the repeat units in the polymer chain contain asymmetric centres. Furthermore, in the crosslinked polyurethane the greater is the degree of crosslinking the greater is the tendency for the polyurethane to be amorphous.

In the polyfunctional compound suitable isocyanate-reactive groups include, for example, —OH, —COOH and —NH$_2$ groups. If desired, mixtures of two or more polyfunctional compounds may be used.

Suitable polyfunctional compounds for use in precursors capable of yielding a cross-linked amorphous elastomeric polyurethane include low molecular weight polydienes terminated with isocyanate-reactive groups, e.g. —COOH and especially -OH groups. The polydienes, which may be, for example, polybutadiene and polymers of hydrocarbyl, especially alkyl, derivatives of butadiene, e.g. polyisoprene, may suitably have a molecular weight in the range 500 to 10,000. Hydroxyl and carboxyl terminated derivatives of copolymers of these dienes with other copolymerisable monomers may be used.

Other suitable polyfunctional compounds include polyesters formed by reaction of a diacid, e.g. an acid having the structure HOOC(CH$_2$)$_n$COOH, where $n$ is a whole number in the range 2 to 10, with a diol which contains a substituent hydrocarbyl group, for example, a hydrocarbyl substituted ethylene glycol, e.g. 1,2-propylene glycol. The polyester may be, for example, poly(propylene succinate), poly(propylene gluarate), poly(propylene adipate) or poly(propylene pimelate). Other suitable polyfunctional compounds include oxypropylated derivatives of diols and polyols, e.g. oxypropylated trimethylol propane. A mixture of polyfunctional compounds which may be mentioned in particular is a mixture of poly(propylene glycol) and oxypropylated trimethylol propane.

The polyisocyanate forming part of the polyurethane precursors may be difunctional or trifunctional or of even higher functionality. The polyisocyanate may be aliphatic, cycloaliphatic or aromatic or may contain in the same polyisocyanate molecule aliphatic and aromatic isocyanate groups, aliphatic and cycloaliphatic isocyanate groups, cycloaliphatic and aromatic isocyanate groups, or even aliphatic cycloaliphatic and aromatic isocyanate groups. If desired mixtures of two or more different polyisocyanates may be used.

Examples of suitable polyisocyanates include 4:4'-diphenylmethane diisocyanate, 2:4- and 2:6-toluene diisocyanates and mixtures thereof, isophorone diisocyanate (3-isocyantomethyl-3,5,5-trimethylcyclohexyl isocyanate), diisocyanates of the structure

OCN — R — NCO, where R is an alkylene chain, for example, tetramethylene diisocyanate, pentamethylene diisocyanate, hexamethylene diisocyanate and octamethylene diisocyanate, and cycloaliphatic diisocyanates, e.g. 4:4'-dicyclohexylmethane diisocyanate.

The polymerisable ethylenically unsaturated material for use in the process of the invention may comprise at least one ethylenically unsaturated monomer which may be monofunctional or polyfunctional and which may suitably comprise the ethylenic unsaturation in a terminal group. If desired, two or more ethylenically unsaturated monomers may be used in combination and in particular the polymerisable ethylenically unsaturated material may comprise a mixture of at least one monofunctional ethylenically unsaturated monomer and at least one polyfunctional ethylenically unsaturated monomer.

The ethylenically unsaturated monomer may be any one or more of the ethylenically unsaturated monomers described in the aforementioned British Pat. No. 1,239,701. In particular it may be selected from methyl methacrylate, ethylene glycol dimethacrylate, trimethylol propane trimethacrylate, a mixture of methyl methacrylate and ethylene glycol dimethacrylate, a mixture of methyl methacrylate and divinyl benzene, a mixture of t-butyl styrene and ethylene glycol dimethacrylate, a mixture of t-butyl styrene and divinyl benzene, and a mixture of styrene and acrylonitrile.

Suitable polyfunctional ethylenically unsaturated monomers, by which we mean a monomer containing two or more polymerisable ethylenically unsaturated groups, include polyvinyl aromatic hydrocarbons, for example, divinyl benzene, trivinyl benzene, divinyl toluene, divinyl naphthalene, and unsaturated esters, for example esters of acrylic or methacrylic acids and polyols, e.g. esters of acrylic or methacrylic acids and diols, that is acrylate or methacrylate bis-esters of diols. For example, the unsaturated ester may be a bis-ester of acrylic or methacrylic acid with a glycol of formula $HO-(CH_2)_n-OH$, where $n$ is a whole number in the range 2 to 10, e.g. ethylene glycol dimethacrylate. Another suitable difunctional monomer is diallyl phthalate.

In the process of our invention the polyurethane precursors in the homogeneous composition should be reacted substantially to completion before polymerisation of the ethylenically unsaturated monomers has proceeded to the extent that the thus formed polymer forms a separate phase, and thereafter the polymerisation of the ethylenically unsaturated monomer should be completed.

By homogeneous composition we mean a composition in which there is no gross phase separation visible to the unaided eye although we do not exclude the possibility of there being a slight haziness in the composition.

Conditions suitable for use in the process of our invention are described in the aforementioned British Pat. No. 1,239,701.

As in general it can be arranged for polyurethane precursors to be reacted at relatively low temperatures and for ethylenically unsaturated monomers to remain unreactive at low temperatures and to be polymerised at relatively high temperatures, the process of our invention is most easily effected by suitable adjustment of the temperature throughout the process. Thus, it is preferred to effect the reaction of the precursors of the cross-linked polyurethane and thereafter to polymerise the ethylenically unsaturated monomer at a temperature higher than that at which the reaction of the precursors is effected.

The reaction of the polyurethane precursors may be assisted by catalysts, for example, tertiary amines and metal salts, e.g. stannous octoate and dibutyl tin dilaurate.

If desired, the nature of the composition may be arranged so that the reaction of the polyurethane precursors may be effected at about ambient temperature, e.g. at or below 30° C and polymerisation of the ethylenically unsaturated monomer at elevated temperatures, e.g. at a temperature of 40° C or higher, preferably 50° C or higher, and more preferably between 50° C and 120° C.

However, such a procedure is not essential in order to effect the process of our invention in the desired manner. By suitable choice of catalysts and inhibitors the sequential reaction of the polyurethane precursors and polymerisation of the ethylenically unsaturated monomer may be effected at the same or at substantially the same temperature.

If desired, a polymerisation inhibitor may be included in the composition to reduce the amount of, or delay the onset of, polymerisation of the ethylenically unsaturated monomer during reaction of the polyurethane precursors, particularly if reaction of the polyurethane precursors is effected above ambient temperature.

Polymerisation of the ethylenically unsaturated monomer may be assisted by a polymerisation initiator. The temperature at which it is to be polymerised and the nature of the initiator to be used depend on the ethylenically unsaturated monomer used.

Suitable initiators are described in the aforementioned British Pat. No. 1,239,701.

The composition may be shaped in any suitably shaped mould, the shaping being effected before reaction of the polyurethane precursors has proceeded to the extent that the composition is no longer sufficiently fluid to be shaped. Preferably, the fluid composition is charged to a suitably shaped mould at a stage where little if any reaction of the polyurethane precursors in the composition has taken place.

In order that the polymer of the ethylenically unsaturated monomer should have a substantial effect on the properties of the elastomeric material of our invention it is preferred that the composition used in the process of our invention should comprise greater than 10% by weight of at least one ethylenically unsaturated monomer and correspondingly less than 90% by weight of cross-linked polyurethane precursors. It is further preferred that the composition used in the process comprises greater than 70% by weight of cross-linked polyurethane precursors and correspondingly less than 30% by weight of at least one ethylenically unsaturated monomer.

We have found that in the invention of the present application where at least one polyfunctional ethylenically unsaturated monomer or a mixture of at least one monofunctional ethylenically unsaturated monomer and at least one polyfunctional ethylenically unsaturated monomer is used in the production of the elastomeric material then the elastomeric material may show a decreased permanent set and may exhibit a more linear stress-strain relationship when compared with an elastomeric material made using only monofunctional ethylenically unsaturated monomer. Suitably, the polyfunctional ethylenically unsaturated monomer, or mixture of monofunctional and polyfunctional ethylenically unsaturated monomers, which in the elastomeric material yields a cross-linked polymer, are used in proportions so as to yield in the cross-linked polymer derived therefrom an average molecular weight between cross-links (Mc) not greater than 2,500, preferably between 100 and 2,000, and more preferably of between 100 and 1,000.

The molecular weight between cross-links (Mc) in the cross-linked polymer produced by polymerisation of the ethylenically unsaturated monomer or monomers is the average Mc in the polymer which would theoretically be produced by polymerisation of the monomer or mixture of monomers. Although the monomer or mixture of monomers may be chosen so as to produce in theory a desired average Mc the actual average Mc in the polymer which is produced may be different from the theoretical average Mc. Thus, we believe that during polymerisation cross-links between the macromolecular chains of the polymer may be produced by grafting in addition to those formed by polymerisation of the polyfunctional monomer and in this case actual average Mc may be lower than the average Mc which would theoretically be produced.

Choice of the amounts of monomer or monomers to be used to give the desired average Mc depends on the molecular weights of the monomers and on the functionality, and hence the number of cross-link points per molecule, of the monomers.

For example, equal parts by mole of a monofunctional ethylenically unsaturated monomer having a molecular weight of 100 and a difunctional ethylenically unsaturated monomer having a molecular weight of 100, which latter monomer contains one cross-link point per molecule, yield a polymer having an average Mc of 200. A mixture of the aforementioned monomers in a proportion of 4:1 by mole yields an average Mc of 500. Similarly, a mixture of four parts by mole of a monofunctional ethylenically unsaturated monomer having a molecular weight of 200 and one part by mole of a trifunctional ethylenically unsaturated monomer having a molecular weight of 50, which latter monomer contains two cross-link points per molecule, yields a polymer having an average Mc of 425.

The elastomeric materials produced by the process of our invention may contain stabilisers, e.g. antioxidants and antiozonants, and ultraviolet stabilisers. The elastomeric materials may also contain particulate filler materials, e.g. carbon black and calcium carbonate and oil extenders. The stabilisers, particulate filler materials and oil extenders are desirably mixed with the composition comprising cross-linked polyurethane precursors and ethylenically unsaturated monomer before reaction of the precursors has commenced, and in any event the stabilisers, particulate filler materials and oil extenders should be added to the composition before reaction of the precursors has proceeded to the extent that the stabilisers, particulate filler and oil extenders can no longer be thoroughly mixed with the composition.

The invention is now illustrated by the following Examples in which all parts are expressed as parts by weight.

Example 1

A. 20 parts of oxypropylated trimethylol propane having a molecular weight of 3000 and a hydroxyl value of 56 mg KOH $g^{-1}$, 20 parts of poly(propylene glycol) having a molecular weight of 2,000 and a hydroxyl value of 56 mg KOH $g^{-1}$, and 5.3 parts of 4,4'-diphenyl methane diisocyanate were mixed together at 60° C and to the resultant solution there was added 18.2 parts of methyl methacrylate, 0.2 part of t-butyl peroctoate and 0.05 part of dibutyl tin dilaurate.

The solution was degassed by connecting to a source of vacuum and charged to a mould formed by a pair of 12 in. × 12 in. glass plates separated by a 1/16 in. thick gasket. The contents of the mould were allowed to stand at 60° C for 4 hours to allow the polyurethane reaction to proceed substantially to completion. Thereafter the mould was heated at 80° C for 16 hours and at 115° C for 2 hours in order to polymerise the methyl methacrylate.

After cooling of the mould a clear, transparent, elastomeric sheet was removed and found to have the properties shown at A in the following table.

B. The procedure of experiment A above was repeated except that 30.2 parts of methyl methacrylate were used. The properties of the resultant clear, transparent elastomer are shown as B in the following table.

C. By way of comparison the procedure of experiment A above was repeated except that the methyl methacrylate and t-butyl peroctoate were omitted, 0.0033 part dibutyl tin dilaurate was used and after degassed solution had been charged to the mould it was heated at 80° C for 16 hours and 115° C for 2 hours.

X-ray examination of the transparent elastomer removed from the mould showed it to be amorphous and the elastomer had the properties shown at C in the following Table. The elastomer had a Tg of −49° C.

| Experiment | A | B | C |
|---|---|---|---|
| Weight % poly(methyl-methacrylate) in elastomeric material | 28.6 | 40 | 0 |
| 100% modulus lb.sq.in$^{-1}$ | 530 | 1080 | 50 |
| 200% modulus lb.sq.in$^{-1}$ | 510 | 770 | — |
| 300% modulus lb.sq.in$^{-1}$ | 514 | 740 | — |
| Elongation to break % | 300 | 320 | 150 |
| Tensile strength lb.sq.in$^{-1}$ | 1540 | 2350 | 100 |

EXAMPLE 2

A. The procedure of Example 1A was repeated except that 50 parts of oxypropylated trimethylol propane, 15 parts of poly(propylene glycol), 8.5 parts of 4:4'-diphenyl methane diisocyanate, 0.2 part of dibutyl tin dilaurate, 0.1 part of t-butyl peroctoate and 18.4 parts of methyl methacrylate (containing 100 ppm Topanol A stabiliser) were used.

The degassed solution charged to the mould was allowed to stand at 50° C to 60° C for 2 hours during which time the polyurethane reaction proceeded substantially to completion.

Thereafter the mould was heated at 80° C for 18 hours and 115° C for 2 hours.

The properties of the transparent elastomeric sheet are shown at A in the following table.

B. The procedure of Experiment A above was repeated except that 50 parts of methyl methacrylate were used.

C. By way of comparison the procedure of experiment A above was repeated except that the methyl methacrylate and t-butyl peroctoate were omitted, 0.01 part of dibutyl tin dilaurate was used and the solution was heated at 80° C for 18 hours and 115° C for 2 hours.

X-ray examination of the elastomer removed from the mould showed it to be amorphous. The elastomer had the properties shown in the following table.

The elastomer had a Tg of −46° C.

| Experiment | A | B | C |
|---|---|---|---|
| Weight % poly(methyl-methacrylate) in elastomeric material | 20 | 40.5 | 0 |
| 100% modulus lb.sq.in$^{-1}$ | 170 | 590 | 86 |
| 200% modulus lb.sq.in$^{-1}$ | 140 | 450 | 66 |
| 300% modulus lb.sq.in$^{-1}$ | 130 | 410 | 79 |
| Elongation to break % | 450 | 550 | 260 |
| Tensile strength lb.sq.in$^{-1}$ | 700 | 2400 | 161 |

EXAMPLE 3

A. 52 parts of a low molecular weight liquid poly(butadiene) containing isocyanate-reactive groups and sold as ARCO R45-M (Arco Chemical Company), 5.9 parts of 4:4'-diphenylmethane diisocyanate, 39 parts of methyl methacrylate, 0.2 part of azobisisobutyronitrile, and 0.03 part of dibutyl tin dilaurate were mixed together and degassed and charged to a mould as used in Example 1.

The polyurethane reaction was completed in a few minutes at room temperature and the mould was then heated in an oven at 80° C for 18 hours and finally at 115° C for 2 hours.

The properties of the elastomeric material removed from the mould are shown as A in the following table.

B. By way of comparison the procedure of experiment A above was repeated except that the methyl methacrylate and azobisisobutyronitrile were omitted.

The properties of the elastomer, which was shown to be amorphous by X-ray examination, are shown at B in the following table.

The elastomer had a Tg of −60° C.

| Experiment | A | B |
|---|---|---|
| Weight % poly(methyl-methacrylate) in elastomeric material | 40.3 | 0 |
| 100% modulus lb.sq.in$^{-1}$ | 1100 | 190 |
| 200% modulus lb.sq.in$^{-1}$ | 1200 | — |
| Elongation to break % | 200 | 150 |
| Tensile strength lb.sq.in$^{-1}$ | 2300 | 230 |

EXAMPLE 4

The procedure of Example 1A was repeated in six separate experiments, experiments A to F, except that 30 parts of oxypropylated trimethylol propane of molecular weight 3000, 100 parts of poly(propylene glycol), 16.7 parts of 4:4'-diphenylmethane diisocyanate, and 0.2 part of dibutyl tin dilaurate were used, and, in place of the methyl methacrylate and t-butyl peroctoate used in Example 1A there was used a mixture of 75 parts by weight of methyl methacrylate, 25 parts by weight of ethylene glycol dimethacrylate and 1 part by weight of t-butyl peroctoate in the following amounts.

| Experiment | A | B | C | E | F |
|---|---|---|---|---|---|
| Parts by weight of mixture | 7.7 | 26.3 | 36 | 63 | 97.8 | 146.7 |

In each experiment the solution was heated in a mould as used in Example 1 at 60° C for 6 hours, 90° C for 6 hours and finally at 110° C for 2 hours.

In a further experiment (G) the above procedure was repeated except that the methyl methacrylate, ethylene glycol dimethacrylate and t-butyl peroctoate were omitted. The resultant elastomer had a Tg of −50° C and was shown to be amorphous on X-ray examination.

The properties of the elastomers are shown in the following table.

| Experiment | A | B | C | D | E | F | G |
|---|---|---|---|---|---|---|---|
| Weight % polymer of mixture of ethylenically unsaturated monomers | 5 | 15 | 20 | 30 | 40 | 50 | 0 |
| 300% modulus lb.sq.in$^{-1}$ | 213 | 850 | 980 | 1980 | — | 184 | |
| Tensile strength lb.sq.in$^{-1}$ | 255 | 1420 | 1630 | 2210 | 2630 | 2700 | 200 |
| Elongation to break % | 330 | 420 | 500 | 540 | 380 | 220 | 290 |

EXAMPLE 5

The procedure of Example 4 was followed in five separate experiments using the following compounds (in parts by weight).

| Experiment | A | B | C | D | E |
|---|---|---|---|---|---|
| oxyprepylated trimethylol propane of molecular weight 3000 | 30 | 30 | 30 | 30 | 30 |
| polypropylene glycol | 0 | 20 | 50 | 100 | 170 |
| 4,4'-diphenylmethane diisocyanate | 3.9 | 6.4 | 10.3 | 16.7 | 26 |
| dibutyl tin dilaurate | 0.3 | 0.5 | 0.8 | 1.3 | 2 |
| mixture of methyl methacrylate and ethylene glycol dimethacrylate containing t-butyl peroctoate | 14.6 | 24.1 | 38.7 | 63 | 95 |

The properties of the resultant elastomers are given in the following table.

| Experiment | A | B | C | D | E |
|---|---|---|---|---|---|
| Weight % of polymer of mixture of ethylenically unsaturated monomers | 30 | 30 | 30 | 30 | 30 |
| 300% modulus lb.sq.in.$^{-1}$ | — | — | 1840 | 980 | 810 |
| Elongtion to break % | 190 | 290 | 400 | 540 | 650 |
| Permanent set at break % | 2 | 6 | 12 | 16 | 26 |
| Tensile strength lb.sq.in$^{-1}$ | 2220 | 2500 | 2560 | 2360 | 2560 |
| Tg of elastomer °C | −45 | −45 | −45 | −50 | −50 |

These experiments, in which all the polyurethane elastomers were amorphous by X-ray examination, illustrate the effect of change of cross-link density in the polyurethane elastomer on the properties of the resultant elastomer.

By way of comparison the procedures of experiments C, D and E were repeated except that in each experiment the mould and contents were heated directly at 110° C for 2 hours in order to react the polyurethane precursors and polymerise the mixture of ethylenically unsaturated monomers simultaneously.

The products removed from the mould were very weak non-elastomeric materials unsuitable for measurement of properties.

EXAMPLE 6

The procedure of Example 4 was repeated using 3.0 parts of oxypropylated trimethylol propane having a molecular weight of 310 in place of the oxypropylated trimethylol propane of molecular weight 3,000, 50 parts of poly(propylene glycol), 10.3 parts of 4:4'-diphenylmethane diisocyanate and 0.8 part of dibutyl tin dilaurate. In place of the mixture of methyl methacrylate and ethylene glycol dimethyacrylate used in Example 4 there was used the following ethylenically unsaturated monomers (each containing 1% by weight of t-butyl peroctoate).

| Experiment | Ethylenically Unsaturated Monomer | |
|---|---|---|
| A | trimethylol propane trimethacrylate | 45 parts |
| B | ethylene glycol dimethacrylate | 45 parts |
| C | ethylene glycol dimethacrylate | 22.5 parts |
|   | methyl methacrylate | 22.5 parts |
| D | ethylene glycol dimethacrylate | 11.3 parts |
|   | methyl methacrylate | 33.7 parts |
| E | ethylene glycol dimethacrylate | 4.5 parts |
|   | methyl methacrylate | 45 parts |
| F | methyl methacrylate | 45 parts |

The properties of the resultant amorphous elastomers in which the proportion of polymer of the ethylenically unsaturated monomer is 33.3% by weight are given in the following table. The table illustrates the change in properties with change in the molecular weight between cross-links (Mc) in the polymer of the ethylenically unsaturated monomer.

| Experiment | A | B | C | D | E | F |
|---|---|---|---|---|---|---|
| Mc | 168 | 198 | 398 | 798 | 1998 | ∞ |
| 300% modulus lb.sq.in$^{-1}$ | — | — | 2700 | 2270 | 1660 | 1210 |
| Elongation to break % | 150 | 200 | 360 | 350 | 450 | 415 |
| Permanent set at break % | 2.0 | 4.0 | 12 | 13 | 30 | 40 |
| Tensile strength lb.sq.in$^{-1}$ | 2270 | 2410 | 3400 | 2700 | 2760 | 1840 |
| Tg of Elastomer °C | −44 | −44 | −44 | −44 | −44 | −44 |

EXAMPLE 7

50 parts of an oxypropylated triol end-capped with ethylene oxide and having a molecular weight of 5,250 and a hyroxyl value of 32 mg KOH g$^{-1}$ and 3.8 parts of 4:4'-diphenyl methane diisocyanate were mixed at 50° C and there was then added 12.5 parts of ethylene glycol dimethacrylate, 12.5 parts of methyl methacrylate, 0.01 part of hydroquinone, 0.25 part of t-butyl perocto-ate and 0.2 part of dibutyl tin dilaurate. The resultant mixture was charged to a mould as used in Example 1 and heated at 120° C for ½ hour.

The properties of the amorphous elastomer removed from the mould were as follows.

| | |
|---|---|
| 300% modulus lb.sq.in$^{-1}$ | 3000 |
| Tensile strength lb.sq.in$^{-1}$ | 3000 |
| Elongation to break % | 300 |
| Permanent set at break % | 7 |
| Tg of elastomer °C | −52 |

EXAMPLE 8

In four separate experiments 36.7 parts of oxypropylated trimethylol propane as used in Example 1, 1.6 parts of trimethylol propane, and 6.72 parts of 4:4'-diphenyl methane diisocyanate were mixed at 50° C and thereafter 0.15 part of t-butyl peroctoate, 0.2 part of dibutyl tin dilaurate and a mixture of ethylenically unsaturated monomers was added. The solution was charged to a mould as used in Example 1 and heated at 60° C for 6 hours and 115° C for 8 hours.

The ethylenically unsaturated monomers used were as follows.

| Experiment | Monomers | | |
|---|---|---|---|
| A | methyl methacrylate | 10 | parts |
| | ethylene glycol dimethacrylate | 5 | parts |
| B | methyl methacrylate | 8.7 | parts |
| | divinyl benzene | 3.5 | parts |
| C | t-butyl styrene | 10 | parts |
| | ethylene glycol dimethacrylate | 5 | parts |
| D | t-butyl stryene | 8.7 | parts |
| | divinyl benzene | 3.5 | parts |

The properties of the amorphous elastomers produced are given in the following table.

| Experiment | A | B | C | D |
|---|---|---|---|---|
| % by weight of polymer of mixture of ethylenically unsaturated monomers | 25 | 22 | 25 | 22 |
| 300% modulus lb.sq.in$^{-1}$ | 2270 | 1420 | 1100 | 570 |
| Tensile strength lb.sq.in$^{-1}$ | 2700 | 2630 | 2200 | 1420 |
| Elongation to break % | 350 | 420 | 450 | 450 |
| Permanent set at break % | 3 | 2 | 6 | 0 |
| Tg of elastomer °C | −45 | −45 | −45 | −45 |

EXAMPLE 9

32.3 parts of poly(propylene glycol) as used in Example 1, 2.46 parts of oxypropylated trimethylol propane having a molecular weight of 310, and 7.22 parts of 4:4'-diphenyl methane diisocyanate were mixed at 50° C and there was then added 9 parts of styrene, 9 parts of acrylonitrile, 0.2 part of azobisisobutyronitrile and 0.3 part of dibutyl tin dilaurate. The mixture was degassed and heated in a mould as used in Example 1 at 60° C for 24 hours and 110° C for 2 hours.

The properties of the resultant amorphous elastomer, containing 36% by weight of a polymer of the ethylenically unsaturated material, are as follows.

| | |
|---|---|
| Tensile strength lb.sq.in$^{-1}$ | 1560 |
| Elongation to break % | 330 |
| 300% modulus lb.sq.in$^{-1}$ | 1350 |

EXAMPLE 10

A. 75 parts of a liquid polyester sold commercially as Daltoroll PR1 (Imperial Chemical Industries Limited), 7.5 parts of mixed tolylene diisocyanates sold commercially as Suprasec SFN (Imperial Chemical Industires Limited), 0.2 part of dibutyl tin dilaurate, 4.1 parts of methyl methacrylate, 4.1 parts of ethylene glycol dimethacrylate and 0.08 part of t-butyl peroctoate were mixed, degassed, and heated in a mould as used in Example 1 at 80° C for 2 hours and 120° C for 4 hours.

B. The procedure of experiment A was repeated except that 14 parts of methyl methacrylate, 14 parts of ethylene glycol dimethacrylate and 0.16 part of t-butyl peroctoate were used.

C. By way of comparison the procedure of experiment A was repeated except that the methyl methacrylate, ethylene glycol dimethacrylate and t-butyl peroctoate were omitted.

The properties of the resultant amorphous elastomers are summarised in the following table.

| Experiment | A | B | C |
|---|---|---|---|
| % by weight of polymer of ethylenically unsaturated monomers | 9 | 25 | 0 |
| 100% modulus lb.sq.in$^{-1}$ | 100 | 400 | 57 |
| 200% modulus lb.sq.in.$^{-1}$ | 200 | 870 | 85 |
| 300% modulus lb.sq.in$^{-1}$ | 385 | 1590 | 130 |
| Tensile strength lb.sq.in.$^{-1}$ | 870 | 2020 | 370 |
| Elongation to break % | 415 | 355 | 510 |

What we claim is:

1. In a process for the production of an elastomeric material from a homogeneous composition comprising from 50% to 95% by weight of the precursors of a cross-linked polyurethane and from 50% to 5% by weight of at least one polymerisable ethylenically unsaturated material in which the precursors of the polyurethane are reacted substantially to completion before polymerisation of the ethylenically unsaturated material is allowed to proceed to the extent that the polymer so produced forms a separate phase and in which polymerisation of the ethylenically unsaturated material is thereafter completed, the improvement which comprises using in said process precursors of a cross-linked polyurethane which, when reacted alone in the absence of ethylenically unsaturated material, are capable of forming an amorphous elastomeric cross-linked polyurethane having a glass-rubber transition temperature (Tg) of 25° C or less.

2. A process as claimed in claim 1 in which the precursors of the cross-linked polyurethane are free of groups reactive with the ethylenically unsaturated material.

3. A process as claimed in claim 1 in which the ethylenically unsaturated material comprises at least one ethylenically unsaturated monomer.

4. A process as claimed in claim 1 in which the composition comprises greater than 70% and less than 90% by weight of cross-linked polyurethane precursors.

5. A process as claimed in claim 1 in which the cross-linked polyurethane precursors are capable of forming an amorphous elastomeric polyurethane having a glass-rubber transition temperature of 0° C or less.

6. A process as claimed in claim 1 in which the polymerisable ethylenically unsaturated material comprises at least one polyfunctional ethylenically unsaturated monomer.

7. A process as claimed in claim 6 in which the polymerisable ethylenically unsaturated material comprises a mixture of at least one monofunctional ethylenically unsaturated monomer and at least one polyfunctional ethylenically unsaturated monomer.

8. A process as claimed in claim 1 in which the cross-linked polyurethane precursors comprise at least one polyisocyanate and a polyfunctional compound reactive therewith which is selected from polybutadiene containing at least two isocyanate-reactive groups and a mixture of poly(propylene glycol) and oxypropylated trimethylol propane.

9. A process as claimed in claim 1 in which the cross-linked polyurethane precursors comprise a polyisocyanate selected from 4:4'-diphenylmethane diisocyanate and tolylene diisocyanate.

10. A process as claimed in claim 3 in which the polymerisable ethylenically unsaturated material is selected from methyl methacrylate, ethylene glycol dimethacrylate, trimethylol propane trimethacrylate, a mixture of methyl methacrylate and ethylene glycol dimethacrylate, a mixture of methyl methacrylate and divinyl benzene, a mixture of t-butyl styrene and ethylene glycol dimethacrylate, a mixture of t-butyl styrene and divinyl benzene, and a mixture of styrene and acrylonitrile.

* * * * *